United States Patent Office 3,529,666
Patented Sept. 22, 1970

3,529,666
METHOD OF IMPROVING PERMEABILITY OF GEOLOGIC FORMATIONS BY REMOVAL OF ORGANIC MATERIAL THEREFROM
Curtis Wendell Crowe, Tulsa, Okla., assignor to The Dow Chemical Company, Midland, Mich., a corporation of Delaware
No Drawing. Filed July 30, 1968, Ser. No. 748,649
Int. Cl. E21b 43/27
U.S. Cl. 166—300                                7 Claims

ABSTRACT OF THE DISCLOSURE

In the treatment of a geologic formation penetrated by a wellbore wherein the porosity of the formation has been impaired by deposition of organic material, especially bacterial deposits, the improvement consisting essentially of: admixing and injecting an aqueous solution of a peroxide selected from the class consisting of hydrogen peroxide, an alkali metal peroxide, or mixture thereof into the formation; following the peroxide solution with a spacer; and thereafter injecting an aqueous acid solution, preferably followed by a water, brine, or inert gas flushing fluid into the formation.

---

The invention relates to fluid injection well treatments for production stimulation. It especially relates to an improvement in water flooding operations involving a unit system comprising input and output wells wherein the growth of bacterial material has been accelerated by the introduction of the flooding waters or, in some instances, by organic material which has been found useful in treatments and wherein the residue thereof has accelerated bacterial growth.

The principal object of the invention is to solubilize and remove organic deposits from a porous fluid-bearing geologic formation thereby to restore the permeability of the formation and, accordingly, increase the production therefrom and decrease the cost of such production. A principal advantage of the invention is the fast action in solubilizing and thereby providing quick removal of the bacterial residue while equipment and personnel are at a well site.

In copending patent application S.N. 628,850, filed Apr. 6, 1967, there is described a method of removing organic material, particularly bacterial deposits from such formation, by injecting thereinto an aqueous solution of a hypochlorite containing a soluble hydroxide or silicate. It has subsequently been discovered that a certain specific type of oxidizing agent which had, upon first evaluation indicated marginal or no beneficial effect (when injected into a formation, which was plugged to an objectionable extent by organic material) are highly beneficial for the removal thereof when such injection is followed by injection of an aqueous mineral acid solution. As a separate invention, there is filed concurrently herewith application S.N. 748,654, directed to a method of removing such organic material due substantially to bacterial deposits where permanganic acid or a water-soluble permanganate, preferably of a pH above 6, followed by an acid is employed.

The invention is carried out by injecting an aqueous solution of hydrogen peroxide, an alkaline metal peroxide, or mixture thereof (e.g., sodium and/or potassium peroxide) at a pressure which is not sufficiently great to fracture the formation; following such injection with separatory sliding plug and/or a sufficient amount of an inert liquid or gas, e.g., water, brine, $CO_2$, nitrogen, or the like to displace at least a substantial portion of the $H_2O_2$ or salt thereof into the formation; thereafter injecting an aqueous solution of an acid having an ionization constant of at least $1 \times 10^{-5}$; and thereafter preferably flushing the residual treating materials from the formation by circulating a water, brine, or gas flushing fluid.

Although the invention is most conveniently practiced as above described the $H_2O_2$ solution may be injected into the formation, allowed to stand for a time or even substantially removed from the formation before the acid solution is injected into the formation if such practice of the invention is preferred.

The amount of hydrogen peroxide, sodium peroxide or potassium peroxide to employ in the practice of the invention is between about 0.1 and 50.0 percent by weight of the aqueous solution employed. The preferred limits thereof to employ are between about 2.0 and 20.0 percent by weight of the aqueous solution employed. Lesser amounts than 0.1 percent do not achieve the desired objectives of the invention to the extent desired. Greater than 50.0 percent tends to produce excessive heat in the formation.

It is recommended, in the practice of the invention, to adjust the pH value of the peroxide to a higher value than its normal value, e.g. at least above 6 and optionally between about 7 and 12, as by the admixture therewith of an alkaline material, e.g., NaOH.

The following examples are illustrative of the practice of the invention:

COMPARATIVE TEST A AND EXAMPLES 1, 2, AND 3

The examples were conducted in accordance with the following procedure:

Sandstone cores containing some limestone, approximately 1 inch in diameter and 3 inches in length, were cut and placed in a Hassler sleeve which consisted essentially of a device whereby a liquid is injected into the end of cylindrical core and forced out the opposite end thereof without being permitted to pass along the circumferential surface thereof and wherein a measured pressure is employed to force the fluid therethrough and the amount of fluid forced therethrough at a specific pressure is collected and measured. A discussion of a Hassler sleeve may be found in the literature, e.g., in Oil Reservoir Engineering by Pirson, pages 74 to 77, inclusive, published by McGraw-Hill, N.Y. (1953).

In the tests, the permeability was obtained and recorded after the injection of each liquid.

In each test the core was first treated with a 15 percent by weight aqueous hydrochloric acid solution until a constant flow rate was established. The initial injection of acid is not essential to the practice of the invention but is used in tests to aid in rendering the sample cores substantially uniform. It was thereafter damaged by forcing thereinto a bacterial residue carried in a 3 percent by weight NaCl brine. The damage was of such nature that only 10 percent of the initial permeability was retained (i.e., it was 90 percent plugged).

Following this damage step, an aqueous oxidizing solution containing, of a specified percentage strength, was forced into, and axially through, the core in the Hassler sleeve until a substantially constant rate of flow was established. Following the treatment by the selected oxidizing agent, an aqueous solution of a mineral acid was forced similarly axially through the core. This was done until a more or less constant rate of flow was established and such rate of flow was compared to each of the flow through both the initial undamaged core and the flow through the bacteria damaged core. In some instances a small amount of sodium hydroxide was admixed with the hydrogen peroxide and exhibited a beneficial effect. The same effect is obtained by passing a solution of NaOH or KOH through the core immediately after the peroxide solution.

The salient procedural steps in the individual tests and the results thereof are shown in Table I.

TABLE I.—CONDITIONS: 150° F. AND 60 P.S.I.G.

| Test or Example | Aqueous oxidizing solution used | Results obtained | |
|---|---|---|---|
| A | 5% $H_2O_2$ only | Residue disintegrated in 4 hours and was about 90% dissolved in 24 hours. | |
| | | Resulting permeability in millidarcys | Percent of original permeability |
| 1 | 15% HCl | 100 | |
| | Bacterial dispersion | 14 | 14 |
| | 5% $H_2O_2$ | 3 | 3 |
| | 15% HCl | 61 | 61 |
| 2 | 15% HCl | 250 | |
| | Bacterial dispersion | 20 | 8 |
| | 5% $H_2O_2$ | 3 | 1 |
| | 15% HCl | 163 | 65 |
| 3 | 15% HCl | 182 | |
| | Bacterial dispersion | 14 | 8 |
| | 12% $Na_2O_2$ neutralized to a pH of 6 | 7 | 4 |
| | 15% HCl | 58 | 32 |

Reference to Table I shows that passing the aqueous solution of hydrogen peroxide or sodium peroxide followed by an aqueous acid solution through the cores restores a large part of the permeability which had existed prior to the injection of the plugging bacterial dispersion.

COMPARATIVE TESTS C TO E

The following tests were conducted for comparative purposes employing other oxidizing agents in a way similar to the hydrogen peroxide or alkali metal peroxide employed above according to the invention.

TABLE II.—CONDITIONS: 150° F. AND 60 P.S.I.G.

| Test No. | Aqueous solution employed | Resulting permeability | Resulting percent of original permeability |
|---|---|---|---|
| C | 15% HCl | 126 | |
| | Bacterial dispersion | 14 | 11 |
| | 4% sodium perborate | 3 | 2 |
| | 15% HCl | 7 | 6 |
| D | 15% HCl | 173 | |
| | Bacterial dispersion | 20 | 12 |
| | 5% chromium trioxide | 10 | 6 |
| | 15% HCl | 51 | 29 |
| E | 15% HCl | 193 | |
| | Bacterial dispersion | 22 | 11 |
| | 15% HCl | 47 | 24 |

COMPARATIVE TESTS F TO O

The following tests were performed by admixing with one-gram samples of the bacterial material in test tubes, at 70° C., each of the aqueous solutions of oxidizing agents, at the concentration set forth in Table III.

TABLE III

| Test No. | Aqueous solution employed | Resulting permeability |
|---|---|---|
| F | 5% chromium trioxide | Residue disintegrated in 24 hours. |
| G | 5% potassium persulfate | No appreciable change in 24 hours. |
| H | 5% potassium persulfate plus 2% sodium hydroxide | Residue partially disintegrated in 24 hours. |
| I | 5% sodium bromate | No appreciable change in 24 hours. |
| J | 5% sodium bromate plus 2% sodium hydroxide | Do. |
| K | 5% nitric acid | Do. |
| L | 5% sodium chlorate | Do. |
| M | 5% sodium chlorate plus 2% sodium hydroxide | Do. |
| N | 5% sodium dichromate | Do. |
| O | 5% sodium dichromate plus 2% sodium hydroxide | Residue disintegrated in 24 hours. |

Reference to Tables II and III shows that agents commonly effective as oxidizing agents for general use are unsatisfactory for use in the practice of the invention.

When any of such other oxidizing agents or mixtures thereof are followed by an aqueous solution of an acid, the results are insufficiently improved to be acceptable.

Having described by invention, what I claim and desire to protect by Letters Patent is:

1. The method of improving the permeability of a porous geologic formation wherein organic materials are lodged in pores thereof comprising injecting in sequence into the formation (1) about a 0.1% to 50% by weight aqueous solution of a peroxide selected from the class consisting of $H_2O_2$, $Na_2O_2$, $K_2O_2$, and mixtures thereof and (2) an aqueous solution of an acid having an ionization constant of at least about $1 \times 10^{-5}$.

2. The method according to claim 1 wherein the peroxide is $H_2O_2$ and the acid is a 5% to 35% by weight aqueous solution of HCl.

3. The method according to claim 2 wherein the $H_2O_2$ is present in a 2.0% to 20.0% by weight aqueous solution thereof.

4. The method according to claim 1 wherein a fluid substantially inert to the peroxide and to the acid is injected as a spacing agent followed by injection of the peroxide and prior to the injection of the acid.

5. The method according to claim 1 wherein a sliding separator plug is inserted between said aqueous solution and said acid.

6. The method according to claim 1 wherein a displacing fluid substantially unreactive with the acid is injected into the formation following the injection of the acid.

7. The method according to claim 1 wherein the pH value of said aqueous solution of a peroxide is raised above 6.

References Cited

UNITED STATES PATENTS

| | | | |
|---|---|---|---|
| 2,481,422 | 9/1949 | Haynes et al. | 166—156 |
| 2,768,694 | 10/1957 | Moll et al. | 166—307 |
| 2,900,026 | 8/1959 | Trusheim | 166—312 X |
| 3,342,262 | 9/1967 | King et al. | 166—300 X |

JAMES A. LEPPINK, Primary Examiner

I. A. CALVERT, Assistant Examiner

U.S. Cl. X.R.

166—307, 312